United States Patent
Sakai

(10) Patent No.: US 12,001,829 B2
(45) Date of Patent: Jun. 4, 2024

(54) OTA CENTER, UPDATE MANAGEMENT METHOD, NON-TRANSITORY STORAGE MEDIUM, OTA MASTER, AND UPDATE CONTROL METHOD

(71) Applicant: TOYOTA JIDOSHA KABUSHIKI KAISHA, Toyota (JP)

(72) Inventor: Yoshikazu Sakai, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 17/740,872

(22) Filed: May 10, 2022

(65) Prior Publication Data

US 2022/0382532 A1    Dec. 1, 2022

(30) Foreign Application Priority Data

May 25, 2021 (JP) ................................ 2021-087786

(51) Int. Cl.
| | |
|---|---|
| *G06F 8/65* | (2018.01) |
| *G01C 21/36* | (2006.01) |
| *G06F 21/57* | (2013.01) |
| *G07C 5/00* | (2006.01) |
| *H04L 67/12* | (2022.01) |

(52) U.S. Cl.
CPC ........... *G06F 8/65* (2013.01); *G01C 21/3667* (2013.01); *G06F 21/57* (2013.01); *G07C 5/008* (2013.01); *H04L 67/12* (2013.01)

(58) Field of Classification Search
CPC . G06F 8/65; G06F 21/57; H04L 67/12; G07C 5/008; G01C 21/3667
See application file for complete search history.

(56) References Cited

U.S. PATENT DOCUMENTS

| | | | |
|---|---|---|---|
| 2019/0391800 A1* | 12/2019 | Lin | ........................... G06F 8/65 |
| 2020/0050442 A1* | 2/2020 | Sakurai | ................... H04L 67/12 |
| 2022/0179644 A1 | 6/2022 | Harata et al. | |

FOREIGN PATENT DOCUMENTS

| | | |
|---|---|---|
| JP | 2004-326689 A | 11/2004 |
| WO | 2021/039796 A1 | 3/2021 |

* cited by examiner

*Primary Examiner* — Tuan A Vu
(74) *Attorney, Agent, or Firm* — Oliff PLC

(57) ABSTRACT

An OTA center includes: one or more storage devices configured to store regulation information; and one or more processors configured to communicate, via a network, with an OTA master mounted on the vehicle and configured to control software update for a target ECU, transmit update data of software of the target ECU to the OTA master, execute, by transmitting the update data, control for causing the OTA master to execute the software update for the target ECU, make a determination whether the software update to be executed is the specific software update, based on the regulation information, and when the determination is positive, transmit, to the OTA master, request information for requesting execution of the specific software update in the predetermined place.

13 Claims, 6 Drawing Sheets

| OTA CAMPAIGN No. | COMMUNICATION DATA AMOUNT (GIGABYTE) | FACE-TO-FACE DESCRIPTION | PARTS REPLACEMENT |
|---|---|---|---|
| 1 | 0.3 | UNNECESSARY | UNNECESSARY |
| ⋮ | ⋮ | ⋮ | ⋮ |
| 10 | 2.0 | NECESSARY | UNNECESSARY |
| 11 | 0.5 | UNNECESSARY | NECESSARY |
| 12 | 1.3 | UNNECESSARY | UNNECESSARY |

FIG. 9

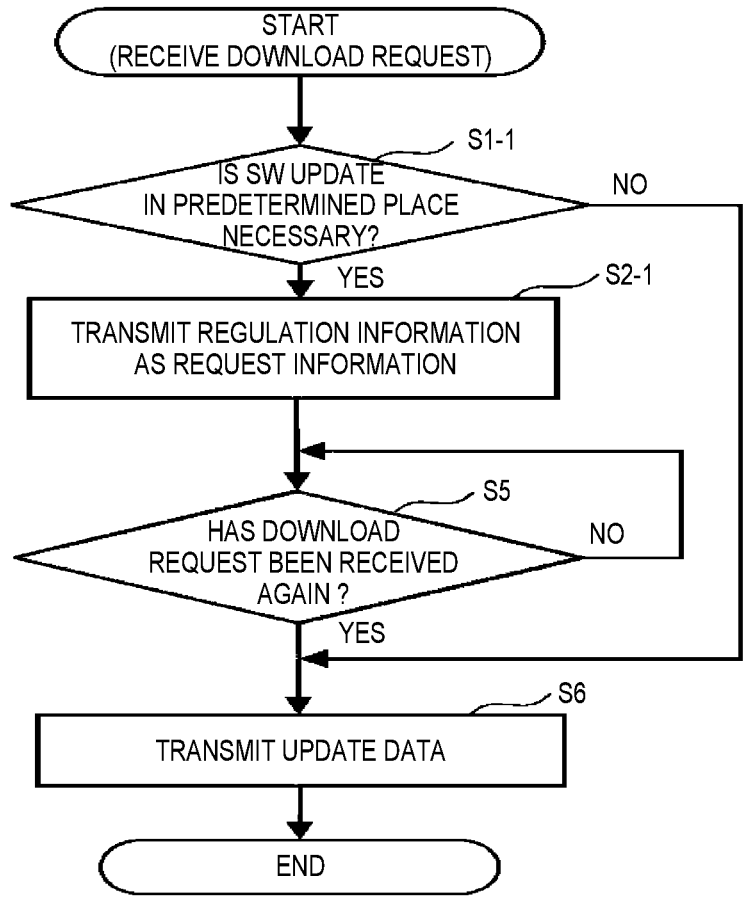

FIG. 10

| OTA CAMPAIGN No. | WHETHER SW UPDATE IN PREDETERMINED PLACE IS NECESSARY (FIRST NECESSITY INFORMATION) | WHETHER SW UPDATE IN VEHICLE SERVICE AREA IS NECESSARY (SECOND NECESSITY INFORMATION) | WHETHER SW UPDATE IN VEHICLE SERVICE AREA OR Wi-Fi AREA IS NECESSARY (THIRD NECESSITY INFORMATION) |
|---|---|---|---|
| 1 | UNNECESSARY | UNNECESSARY | UNNECESSARY |
| ⋮ | ⋮ | ⋮ | ⋮ |
| 10 | NECESSARY | NECESSARY | UNNECESSARY |
| 11 | NECESSARY | NECESSARY | UNNECESSARY |
| 12 | NECESSARY | UNNECESSARY | NECESSARY |

OTA CENTER, UPDATE MANAGEMENT METHOD, NON-TRANSITORY STORAGE MEDIUM, OTA MASTER, AND UPDATE CONTROL METHOD

CROSS-REFERENCE TO RELATED APPLICATION

This application claims priority to Japanese Patent Application No. 2021-087786 filed on May 25, 2021, incorporated herein by reference in its entirety.

BACKGROUND

1. Technical Field

The present disclosure relates to an OTA center, an update management method, a non-transitory storage medium, an OTA master, and an update control method.

2. Description of Related Art

A plurality of electronic control units (ECUs) used for controlling an operation of a vehicle is mounted on a vehicle. The ECU includes a processor, a transitory storage unit, such as a random access memory (RAM), and a non-volatile storage unit, such as a flash read-only memory (ROM). A control function of the ECU is implemented when the processor executes software stored in the non-volatile storage unit. Software stored in each ECU is rewritable, and by updating to a newer version of the software, it is possible to improve a function of each ECU or add a new vehicle control function.

As a technology for updating software of an ECU, an over-the-air (OTA) technology is well-known. In the OTA technology, a technology that wirelessly connects an in-vehicle communication device connected to an in-vehicle network to a communication network, such as the Internet, and updates or adds a program of the ECU by downloading software (update data) from an OTA center via wireless communication and installing the downloaded software (see, for example, Japanese Unexamined Patent Application Publication No. 2004-326689.)

SUMMARY

It may be necessary to execute OTA in a predetermined place (a limited place). For example, when software with a large amount of communication data is updated by the OTA, it may be necessary to execute the OTA in a predetermined place in order to restrain a communication cost. Further, for example, at a time of execution of software update (for example, at a vehicle dealer), it may be necessary to describe the content of the software update and the like face-to-face to a user of a vehicle. Further, for example, at the time of the software update (for example, at a vehicle dealer), it may be necessary to replace parts, such as an ECU replacement. When the execution of the OTA in a predetermined place (a limited place) is necessary, an appropriate measure needs to be taken.

Therefore, the present disclosure provides an OTA center, an update management method, a non-transitory storage medium, an OTA master, and an update control method that can take an appropriate measure when execution of the OTA in a predetermined place (a limited place) is necessary.

An OTA center according to a first aspect of the present disclosure includes: one or more storage devices configured to store regulation information based on which software update is determined whether to be specific software update that needs to be executed when a vehicle is positioned in a predetermined place; and one or more processors configured to communicate, via a network, with an OTA master mounted on the vehicle and configured to control software update for a target electric control unit (ECU) mounted on the vehicle, transmit update data of software of the target ECU to the OTA master, execute, by transmitting the update data, control for causing the OTA master to execute the software update for the target ECU, make a determination whether the software update to be executed is the specific software update, based on the regulation information, and when the determination is positive, transmit, to the OTA master, request information for requesting execution of the specific software update in the predetermined place.

An update management method according to a second aspect of the present disclosure is executed by a computer including one or more processors and one or more memories. The update management method includes: storing regulation information based on which software update is determined whether to be specific software update that needs to be executed when a vehicle is positioned in a predetermined place; communicating, via a network, with an OTA master mounted on the vehicle and configured to control software update for a target ECU mounted on the vehicle; making a determination whether the software update to be executed is the specific software update, based on the regulation information; when the determination is positive transmitting, to the OTA master, request information for requesting execution of the specific software update in the predetermined place; transmitting update data of software of the target ECU to the OTA master; and executing, by transmitting the update data, control for causing the OTA master to execute the software update for the target ECU.

A non-transitory storage medium according to a third aspect of the present disclosure stores instructions that are executable by a computer which includes one or more processors and one or more memories, and that cause the computer to execute the method according to the second aspect.

An OTA master according to a fourth aspect of the present disclosure is mounted on a vehicle. The OTA master includes one or more processors configured to: communicate with an OTA center via a network, receive, from the OTA center, update data of software of a target electric control unit (ECU) mounted on the vehicle, control software update for the target ECU using the update data, and cause, when receiving request information for requesting execution of the software update in a predetermined place from the OTA center, a display unit mounted on the vehicle to display the predetermined place.

An update control method according to a fifth aspect of the present disclosure is executed by a computer including one or more processors and one or more memories and mounted on a vehicle. The update control method includes: communicating with an OTA center via a network; causing, when receiving request information for requesting execution of software update in a predetermined place from the OTA center, a display unit mounted on the vehicle to display the predetermined place; receiving, from the OTA center, update data of software of a target ECU mounted on the vehicle; and controlling the software update for the target ECU using the update data.

A non-transitory storage medium according to a sixth aspect of the present disclosure stores instructions that are executable by a computer which includes one or more processors and one or more memories and which is mounted on a vehicle, and that cause the computer to execute the update control method according to the fifth aspect.

With each aspect of the present disclosure, it is possible to provide an OTA center, an update management method, a non-transitory storage medium, and OTA master, and update control method that can take an appropriate measure when execution of OTA in a predetermined place (a limited place) is necessary.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a flowchart illustrating an example of control processing executed by the OTA center according to a second embodiment; and FIG. 10 is a schematic diagram used for describing an example of regulation information according to the second embodiment.

DETAILED DESCRIPTION OF EMBODIMENTS

First Embodiment

Figure 1:
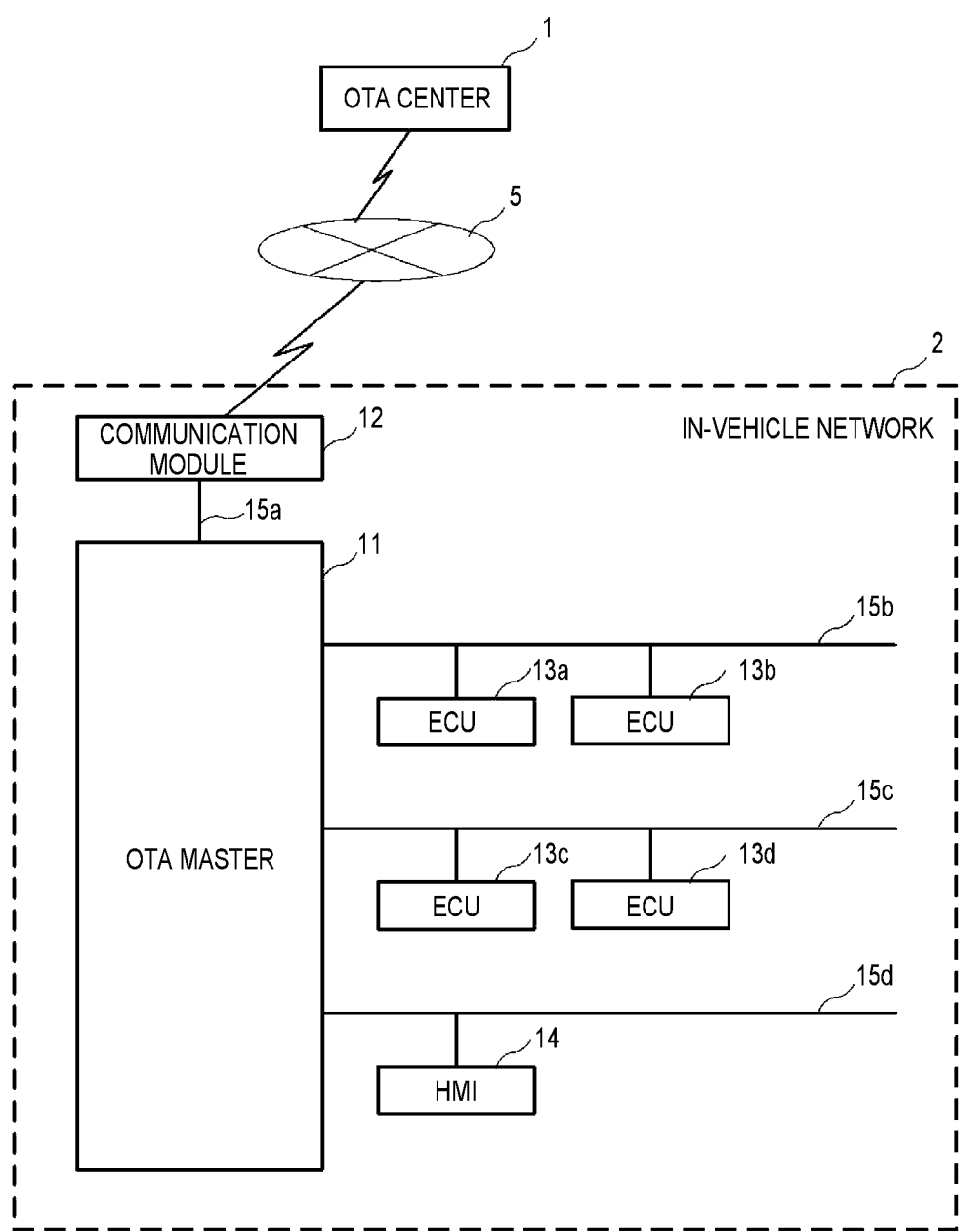
FIG. 1 is a block diagram illustrating an example of an overall configuration of a network system according to a first embodiment.
Figure 2:
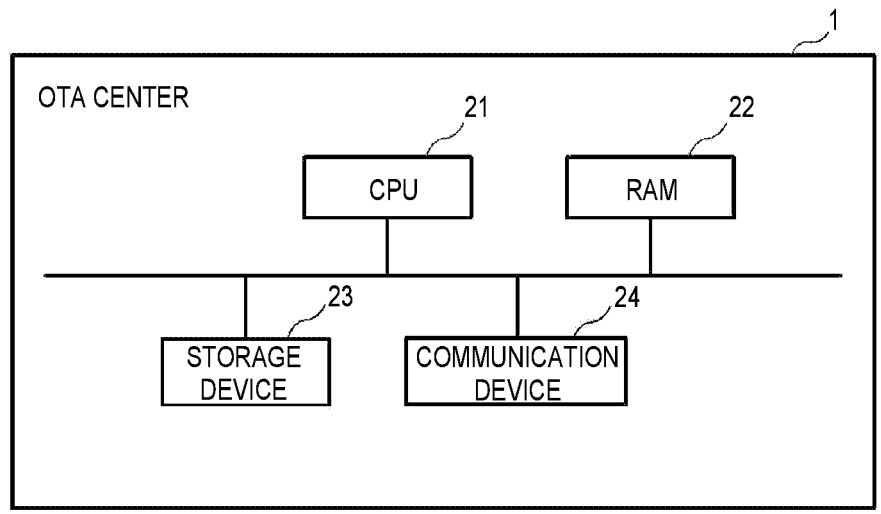
FIG. 2 is a block diagram illustrating an example of a schematic configuration of an OTA center according to the first embodiment.
Figure 3:
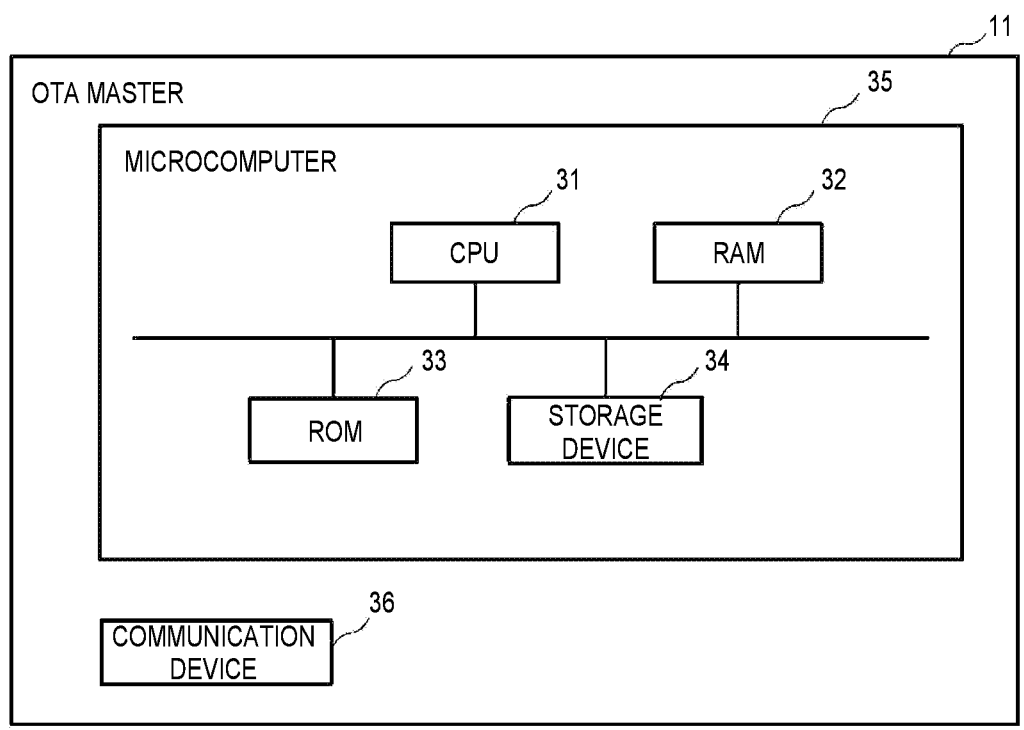
FIG. 3 is a block diagram illustrating an example of a schematic configuration of an OTA master according to the first embodiment.

FIG. 1 is a block diagram illustrating an example of an overall configuration of a network system according to a first embodiment. FIG. 2 is a block diagram illustrating an example of a schematic configuration of an OTA center according to the first embodiment. FIG. 3 is a block diagram illustrating an example of a schematic configuration of an OTA master according to the first embodiment.

A network system illustrated in FIG. 1 is a system used for updating pieces of software of ECUs 13a to 13d mounted on a vehicle, and includes an OTA center 1 and an in-vehicle network 2 mounted on the vehicle.

The OTA center 1 can communicate in a wireless manner and the like with an OTA master 11 mounted on the vehicle via a communication network 5, such as the Internet, and manage an update of the pieces of the software of the ECUs 13a to 13d mounted on the vehicle.

As illustrated in FIG. 2, the OTA center 1 includes a CPU 21, a RAM 22, a storage device 23, and a communication device 24. The number of CPUs 21, RAMs 22, storage devices 23, and communication devices 24 included in the OTA center 1 is not limited to one, respectively. The storage device 23 includes a readable/writable storage medium, such as a hard disk or an SSD, and stores a program for executing software update management, information used for update management, update data for an ECU, or the like. The CPU 21 executes control processing by executing the program read from the storage device 23 using the RAM 22 as a work area. The communication device 24 communicates with the OTA master 11 via the communication network 5.

As illustrated in FIG. 1, the in-vehicle network 2 includes the OTA master 11, a communication module 12, a plurality of ECUs 13a to 13d, and a human machine interface (HMI; for example, a display device of a car navigation system capable of an input operation) 14. The OTA master 11 is connected to the communication module 12 via a bus 15a, connected to the ECUs 13a, 13b via a bus 15b, connected to the ECUs 13c, 13d via a bus 15c, and connected to the HMI 14 via a bus 15d. The OTA master 11 can communicate with the OTA center 1 in a wireless manner via the communication module 12. Based on the update data acquired from the OTA center 1, the OTA master 11 executes control of the software update of an ECU (sometimes referred to as a "target ECU") of which the software (sometimes referred to as "SW") is to be updated from among the ECUs 13a to 13d. The communication module 12 is a communication device that connects the in-vehicle network 2 to the OTA center 1. The ECUs 13a to 13d executes control of an operation of each part of the vehicle. At the time of the execution of the software update processing of the ECUs 13a to 13d, the HMI 14 is used for executing various displays, such as a display representing that the update data exists, a display of an approval request screen for requesting approval for the software update from a user or a manager, and a display of a result of the software update. Although four ECUs 13a to 13d are illustrated in FIG. 1, the number of ECUs is not limited.

As illustrated in FIG. 3, the OTA master 11 includes a microcomputer 35 including a CPU 31, a RAM 32, a ROM 33, and a storage device 34, and a communication device 36. The number of microcomputers 35 and communication devices 36 included in the OTA master 11 is not limited to one, respectively. The CPU 31 executes control processing by executing a program read from the ROM 33 using the RAM 32 as a work area. The communication device 36 communicates with the communication module 12, the ECUs 13a to 13d, and the HMI 14 via the buses 15a to 15d illustrated in FIG. 1.

Each of the ECUs 13 (13a to 13d) includes a CPU, a RAM, a non-volatile memory, and a communication device (neither of them shown). The CPU of the ECU 13 implements a function of the ECU 13 by executing a program read from the non-volatile memory using the RAM as a work area and by communicating with other devices using the communication device.

Here, the software update processing is composed of a phase of downloading the update data from the OTA center 1 to the OTA master 11, a phase of transferring the downloaded update data to the target ECU that is an update target and installing the update data on the storage area of the target ECU, and a phase of activation of making the updated version of the software installed in the target ECU active.

The download is processing for receiving the update data for updating the software of the ECU transmitted from the OTA center 1 and storing it in the storage device 34 of the OTA master 11. The download phase includes not only the reception of the update data, but also control of a series of processes associated with the download, such as determining whether the download can be executed and verifying the update data. Installation is processing for writing an updated version of the program (the update software) to the non-volatile memory of the target ECU based on the downloaded update data. The installation phase includes not only the execution of the installation, but also control of a series of processes associated with the installation, such as determining whether the installation can be executed, transferring the update data, and verifying the updated version of the program. Activation is processing for activating (making active) the installed updated version of the program. The activation phase includes not only the execution of the activation but also control of a series of processes associated with the activation, such as determining whether the activation can be executed and verifying the execution result.

The update data transmitted from the OTA center 1 to the OTA master 11 may include any of the update software of the ECU, the compressed data obtained by compressing the update software, or the divided data obtained by dividing the update software or the compressed data. Further, the update data may include an identifier (ECU ID) for identifying the target ECU and an identifier (ECU software ID) for identifying the software before the update. The update data is downloaded as the distribution package, and the distribution package includes the update data of one or more ECUs.

When the update data includes the update software itself, the OTA master 11 transfers the update data (that is, the update software) to the target ECU in the installation phase. Further, when the update data includes compressed data, difference data, or divided data of the update software, the OTA master 11 may transfer the update data to the target ECU, and the target ECU may generate the update software from the update data. Alternatively, the OTA master 11 may generate the update software from the update data and transfer the update software to the target ECU. Here, the update software can be generated by, for example, decompressing the compressed data, assembling the difference data or the divided data.

The update software can be installed by the target ECU based on an installation request from the OTA master 11. Alternatively, the target ECU that has received the update data may autonomously execute the installation without receiving an explicit instruction from the OTA master 11.

The update software can be activated by the target ECU based on an activation request from the OTA master 11. Alternatively, the target ECU that has received the update data may autonomously execute the activation without receiving an explicit instruction from the OTA master 11.

Figure 4:
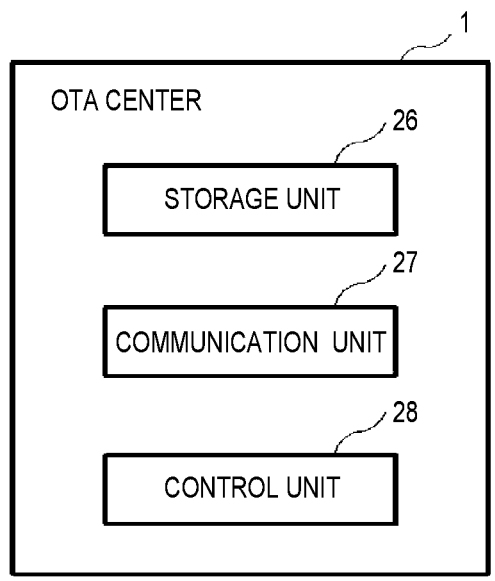
FIG. 4 is a functional block diagram illustrating an example of the OTA center according to the first embodiment.

FIG. 4 is an example of a functional block diagram of the OTA center 1 illustrated in FIG. 1. As illustrated in FIG. 4, the OTA center 1 includes a storage unit 26, a communication unit 27, and a control unit 28. Functions of the communication unit 27 and the control unit 28 are implemented when the CPU 21 illustrated in FIG. 2 executes a program stored in the storage device 23 using the RAM 22. A function of the storage unit 26 is implemented by the storage device 23 illustrated in FIG. 2.

Figure 5:
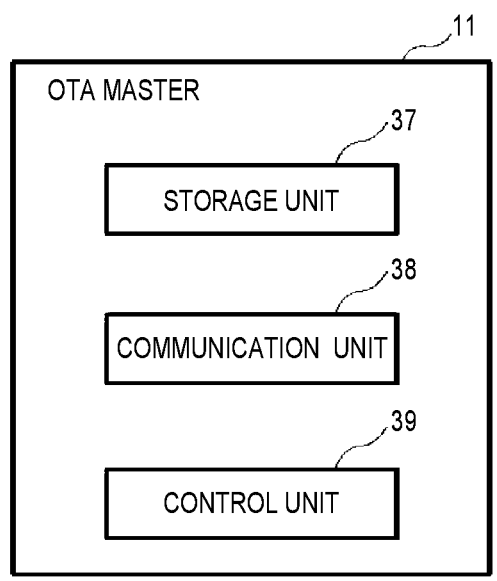
FIG. 5 is another functional block diagram illustrating an example of the OTA master according to the first embodiment.

FIG. 5 is an example of a functional block diagram of the OTA master 11 illustrated in FIG. 1. As illustrated in FIG. 5, the OTA master 11 includes a storage unit 37, a communication unit 38, and a control unit 39. Functions of the communication unit 38 and the control unit 39 are implemented when the CPU 31 illustrated in FIG. 3 executes a program stored in the ROM 33 using the RAM 32. A function of the storage unit 37 is implemented by the storage device 34 illustrated in FIG. 3.

Figures 6, 7:
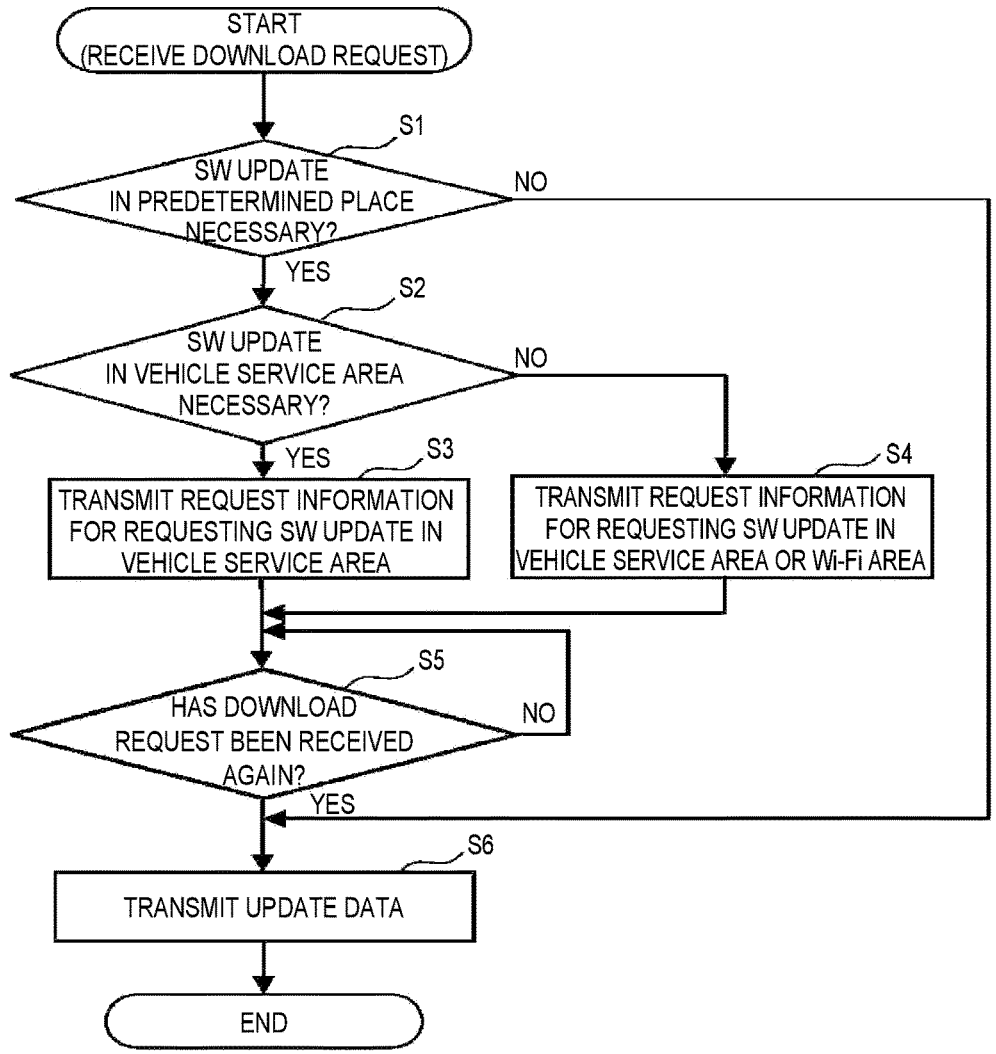
FIG. 6 is a flowchart illustrating an example of control processing executed by the OTA center according to the first embodiment.
FIG. 7 is a schematic diagram used for describing an example of regulation information according to the first embodiment.

FIG. 6 is a flowchart illustrating an example of the control processing executed by the OTA center 1 in the first embodiment. Hereinafter, the control processing of the OTA center 1 according to the first embodiment will be described with reference to the flowchart illustrated in FIG. 6.

The processing illustrated in FIG. 6 is started when the communication unit 27 of the OTA center 1 receives, from the vehicle (from the OTA master 11), a download request for the update data (the distribution package) for executing the software update by the OTA campaign.

In step S1, the control unit 28 of the OTA center 1 determines whether the execution of the software update in a predetermined place (a limited place) is necessary based on regulation information stored in the storage unit 26. Hereinafter, it will be described in detail.

FIG. 7 is a schematic diagram used for describing an example of the regulation information stored in the storage unit 26. As illustrated in FIG. 7, the regulation information includes information (sometimes referred to as "communication data amount information") indicating a communication data amount necessary for the software update for each OTA campaign, information (sometimes referred to as "face-to-face description necessity information") indicating whether making a face-to-face description (that is, describing precautions and the like) to the user of the vehicle is necessary at the time of the execution of the software update, and information (sometimes referred to as "parts replacement necessity information") indicating whether replacing parts, such as an ECU replacement, is necessary at the time of the execution of the software update. As illustrated in FIG. 7, for example, in a case of campaign No. 10, the communication data amount is 2.0 gigabytes, the face-to-face description is necessary, and parts replacement is unnecessary, and in a case of campaign No. 11, the communication data amount is 0.5 gigabytes, the face-to-face description is unnecessary, and parts replacement is necessary.

In step S1, the control unit 28 determines whether the execution of the software (SW) update in a predetermined place (a limited place) is necessary based on the communication data amount information, the face-to-face description necessity information, and the parts replacement necessity information corresponding to the OTA campaigns associated with the download request. Specifically, when at least one of a case where the communication data amount exceeds a predetermined amount (in the present embodiment, 1.0 gigabytes), a case where the face-to-face description is necessary, and a case where parts replacement is necessary is satisfied, the control unit 28 determines whether the execution of the software update in a predetermined place (a limited place) is necessary. For example, when the OTA campaign associated with the download request is No. 1 (see FIG. 7), the communication data amount does not exceed 1.0 gigabytes, the face-to-face description is unnecessary, and the parts replacement is unnecessary, and thus the control unit 28 determines that the execution of the software update in a predetermined place (a limited place) is unnecessary. For example, when the OTA campaign associated with the download request is No. 10, the communication data amount exceeds 1.0 gigabytes, the face-to-face description is necessary, and the parts replacement is unnecessary, and thus the control unit 28 determines that the execution of the software update in a predetermined place (a limited place) is necessary. For example, when the OTA campaign associated with the download request is No. 11, the communication data amount does not exceed 1.0 gigabytes, the face-to-face description is unnecessary, and the parts replacement is necessary, and thus the control unit 28 determines that the execution of the software update in a predetermined place (a limited place) is necessary. For example, when the OTA campaign associated with the download request is No. 12, the communication data amount exceeds 1.0 gigabytes, the face-to-face description is unnecessary, and the parts replacement is unnecessary, and thus the control unit 28 determines that the execution of the software update in a predetermined place (a limited place) is necessary.

When the determination in step S1 is YES, the process proceeds to step S2, and when the determination is NO, the process proceeds to step S6.

In step S2, the control unit 28 determines (decides) whether the execution of the software update in a vehicle service area is necessary based on the regulation information (see FIG. 7) stored in the storage unit 26. The vehicle service area is a place in which a vehicle service can be received (for example, a vehicle dealer). The vehicle service area is a place in which the parts replacement of the vehicle or the like can be executed, the face-to-face description on the OTA campaign can be executed, and connection to a communication network (sometimes referred to as a "vehicle service area communication network") connectable to the Internet by which the vehicle can download the update data of the OTA campaign in a wireless or wired manner is possible. Specifically, when at least one of the "face-to-face description" and the "parts replacement" is "necessary" in the regulation information (see FIG. 7), the control unit 28 determines that the execution of the software update in the vehicle service area is necessary. For example, when the OTA campaign associated with the download request is No. 10, the "face-to-face description" is "necessary", and thus the control unit 28 determines that the execution of the software update in the vehicle service area is necessary. For example, when the OTA campaign associated with the download request is No. 11, the "parts replacement" is "necessary", and thus the control unit 28 determines that the execution of the software update in the vehicle service area is necessary. On the other hand, for example, when the OTA campaign associated with the download request is No. 12, both the "face-to-face description" and the "parts replacement" are "unnecessary", and thus the control unit 28 determines that the execution of the software update in the vehicle service area is unnecessary. When the determination in step S2 is YES, the process proceeds to step S3, and when the determination is NO, the process proceeds to step S4.

In step S3, the control unit 28 transmits, using the communication unit 27, the request information for requesting the execution of the software update in the vehicle service area to the vehicle (the OTA master 11) that has made the download request. Thereafter, the process proceeds to step S5. As will be described below with reference to FIG. 8, the vehicle (the OTA master 11) that has received the request information guides the subject vehicle to any one of one or more vehicle service areas using a car navigation system.

On the other hand, in step S4, the control unit 28 transmits, using the communication unit 27, the request information for requesting the execution of the software update in the vehicle service area or a Wireless Fidelity (Wi-Fi) area to the vehicle (the OTA master 11) that has made the download request. The Wi-Fi area is a place in which a wireless connection can be made to the Internet by Wi-Fi. Thereafter, the process proceeds to step S5. As will be described below with reference to FIG. 8, the vehicle (the OTA master 11) that has received the request information causes the car navigation system to guide the vehicle to any one of one or more vehicle service areas and the Wi-Fi areas.

As described above, when the face-to-face description, the parts replacement, or the like is necessary at the time of the execution of the software update, in step S3, request information for requesting the execution of the software update in the vehicle service area in which the face-to-face description, the parts replacement, or the like can be executed (not in the Wi-Fi area in which the face-to-face description or the parts replacement cannot be executed) is transmitted. On the other hand, when the communication data amount exceeds a predetermined amount (1.0 gigabytes) (that is, in a case where a communication cost is charged when Internet communication is executed via mobile data communication), in step S4, request information for requesting the execution of the software update in the vehicle service area or the Wi-Fi area is transmitted so as to restrain the communication cost.

Here, in the mobile data communication, an area in which communication is possible is substantially wide (that is, an area in which it is possible to connect to the Internet and download the update data is substantially wide), but, in general, the communication cost of the user increases according to the communication data amount. For this reason, in a case where the update data is downloaded via the mobile data communication and the software update for the ECU is executed, generally, the communication data amount is large, and the communication cost is charged to the user. On the other hand, in the data communication by Wi-Fi, a range in which communication is possible is narrow (for example, a range of several tens of meters), but, in general, the communication cost of the user does not incur (or is relatively inexpensive). For this reason, in a case where connection to the Internet is executed by Wi-Fi and the update data for the ECU is downloaded in the Wi-Fi area, the communication cost of the user can be restrained even when the communication data amount is large. Examples of the Wi-Fi area includes a Wi-Fi area provided by a Wi-Fi device installed at a user's house, a Wi-Fi area provided free of charge by a Wi-Fi device installed at a restaurant and the like, or a Wi-Fi area provided by a vehicle manufacturer for the purpose of use for an OTA campaign and the like. Further, the data communication by the vehicle service area communication network can be executed in the vehicle service area, and generally, the communication cost of the user does not incur. For this reason, in a case where connection to the Internet is executed, the update data is downloaded, and the software update for the ECU is executed in the vehicle service area, the communication cost of the user can be restrained even when the communication data amount is large.

In step S5, the control unit 28 stands by until it receives the download request again from the vehicle (the OTA master 11) that has made the download request (NO), and when it receives the download request again (YES), the process proceeds to step S6. As will be described below with reference to FIG. 8, when the vehicle is guided (moves), by the car navigation system based on the request information, to a place in which the software update is executed, the vehicle (the OTA master 11) transmits the download request to the OTA center 1 again.

In step S6, the control unit 28 transmits the update data to the vehicle (the OTA master 11) that has made the download request via the Internet using the communication unit 27, and the processing of FIG. 6 ends. As such, as will be described below with reference to FIG. 8, the vehicle (the OTA master 11) that has made the download request downloads the update data and executes the software update for the target ECU.

Figure 8:
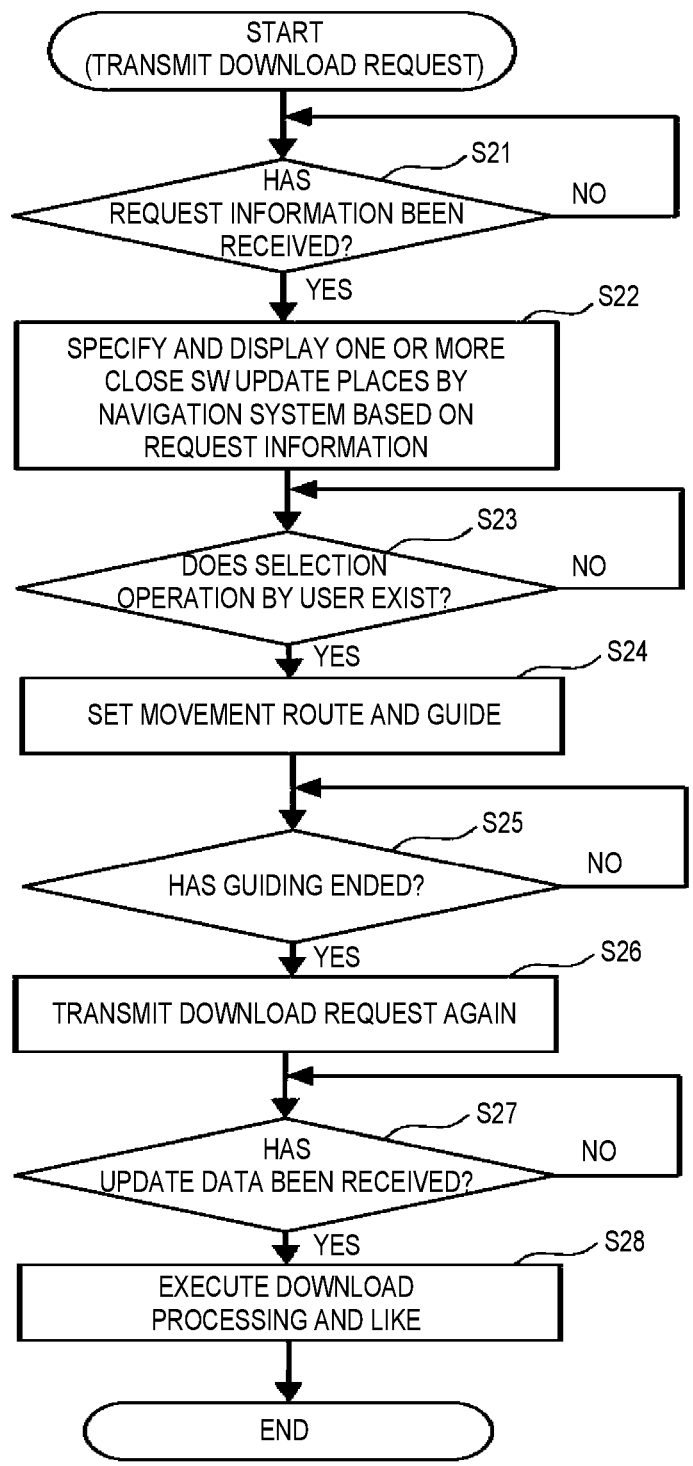
FIG. 8 is a flowchart illustrating an example of control processing executed by the OTA master according to the first embodiment.

FIG. 8 is a flowchart illustrating an example of the control processing executed by the OTA master 11 in the first embodiment. Hereinafter, the control processing of the OTA master 11 according to the first embodiment will be described with reference to the flowchart illustrated in FIG. 8.

The processing illustrated in FIG. 8 is started when the control unit 39 of the OTA master 11 transmits, to the OTA center 1, using the communication unit 38, the download request for the update data (the distribution package) for executing the software update by the OTA campaign.

In step S21, the control unit 39 of the OTA master 11 stands by until it receives the request information transmitted from the OTA center 1 in step S3 or S4 of FIG. 6 (NO), and when it receives the request information (YES), the process proceeds to step S22.

In step S22, the control unit 39 specifies and displays one or more close software update places by the car navigation system mounted on the vehicle based on the request information received in step S21. Hereinafter, a specific description will be made. Upon receiving the request information for requesting the software update in the vehicle service area (see S3 of FIG. 6) in step S21, the control unit 39 specifies the predetermined number (for example, three) of vehicle service areas that are close to the vehicle by car navigation system (not shown) using the global positioning system (GPS), and causes the HMI (for example, a display device of the car navigation system capable of an input operation) 14 to display them as software update places. On the other hand, upon receiving the request information for requesting the software update in the vehicle service area or the Wi-Fi area (refer to S4 of FIG. 6) in step S21, the control unit 39 specifies the predetermined number (for example, three) of vehicle service areas or Wi-Fi areas that are close to the vehicle by car navigation system, and causes the HMI 14 to display them as software update places. Thereafter, the process proceeds to step S23.

In step S23, the control unit 39 stands by until there is a selection operation by the user for the software update place displayed on the HMI 14 in step S22 (NO), and when there is a selection operation (YES), the process proceeds to step S24.

In step S24, the control unit 39 sets a movement route to the software update place selected in step S23 and causes the car navigation system to guide the vehicle. Thereafter, the process proceeds to step S25.

In step S25, the control unit 39 stands by until the guidance (movement) of the vehicle to the software update place selected in step S23 ends (NO), and when the guidance ends (YES), the process proceeds to step S26.

In step S26, the control unit 39 transmits the download request for the update data (the distribution package) again to the OTA center 1 by the communication unit 38. Thereafter, the process proceeds to step S27. The OTA center 1 receives the download request in step S5 of FIG. 6.

In step S27, the control unit 39 stands by until it receives the update data transmitted (see S6 of FIG. 6) from the OTA center 1 (NO), and when it receives the update data (YES), the process proceeds to step S28.

In step S28, the control unit 39 executes the download processing and the like of the update data received in step S27. Specifically, after storing the update data received in step S27 in the storage unit 37, the control unit 39 executes the software update processing by transmitting the update data to the target ECU, installing the update data, and activating the update data. Thereafter, the processing of FIG. 8 ends.

Second Embodiment

A second embodiment differs from the first embodiment described above in that the regulation information differs from that in the first embodiment, and the OTA center 1 does not execute the processing for deciding the software update place based on the regulation information in the control processing. FIG. 9 is a flowchart illustrating an example of the control processing executed by the OTA center 1 according to the second embodiment. FIG. 10 is a schematic diagram used for describing an example of the regulation information according to the second embodiment. In the flowchart of FIG. 9, with respect to the flowchart of FIG. 6, step S1 is replaced with step S1-1 and steps S2 to S4 are replaced with step S2-1. In the second embodiment, the processing on the vehicle side is the same as that in the first embodiment (see FIG. 8) (except for the specific processing content of step S22). Hereinafter, the content different from that in the first embodiment will be mainly described.

In step S1-1, the control unit 28 of the OTA center 1 determines, based on the regulation information (see FIG. 10) stored in the storage unit 26, whether the execution of the software update in a predetermined place (a limited place) is necessary. Hereinafter, it will be described in detail.

FIG. 10 is a schematic diagram used for describing an example of the regulation information stored in the storage unit 26. As illustrated in FIG. 10, the regulation information includes information indicating whether the execution of the software update in a predetermined place (a limited place) is necessary for each OTA campaign (sometimes referred to as "first necessity information"), information indicating whether the execution of the software update in the vehicle service area (sometimes referred to as "second necessity information") is necessary, and information indicating whether the execution of the software update in the vehicle service area or the Wi-Fi area (sometimes referred to as "third necessity information") is necessary.

Here, as described in the first embodiment, the vehicle service area is a place in which the vehicle service can be received (for example, a vehicle dealer). The service area is a place in which the parts replacement of the vehicle or the like can be executed, the face-to-face description on the OTA campaign can be executed, and connection to a communication network (the "vehicle service area communication network") connectable to the Internet by which the vehicle can download the update data of the OTA campaign in a wireless or wired manner is possible. Further, as described in the first embodiment, the Wi-Fi area is a place in which wireless connection can be made to the Internet by Wi-Fi. Then, when a situation corresponds to at least one of the case where the face-to-face description (that is, describe precautions and the like) to the user of the vehicle is necessary at the time of the execution of the software update and the case where replacing a part, such as an ECU replacement, is necessary, at the time of the execution of the software update, the execution of the software update in the vehicle service area is necessary, and thus the second necessity information indicates "necessary". Further, when the communication data amount exceeds a predetermined amount (in the present embodiment, 1.0 gigabytes), the execution of the software update in the vehicle service area or the Wi-Fi area is necessary to so as to restrain the communication cost, and thus the third necessity information indicates "necessary". Further, when the second necessity information or the third necessity information indicates "necessary", the execution of the software update in a predetermined place (a limited place) is necessary, and thus the first necessity information indicates "necessary".

In step S1-1, the control unit 28 determines whether the execution of the software update in a predetermined place (a limited place) is necessary according to the first necessity information corresponding to the OTA campaign associated with the download request. Specifically (see FIG. 10), when the first necessity information indicates "necessary", the control unit 28 determines that the execution of the software update in a predetermined place (a limited place) is necessary. For example, when the OTA campaign associated with the download request is No. 1, the first necessity information indicates "unnecessary", and thus the control unit 28 determines that the execution of the software update in a predetermined area (a limited area) is unnecessary. For example, when the OTA campaign associated with the download request is No. 10, the first necessity information indicates "necessary", and thus the control unit 28 determines that the execution of the software update in a predetermined area (a limited area) is necessary. When the determination in step S1-1 is YES, the process proceeds to step S2-1, and when the determination is NO, the process proceeds to step S6.

In step S2-1, the control unit 28 transmits, using the communication unit 27, as the request information, the regulation information corresponding to the OTA campaign associated with the download request to the vehicle (the OTA master 11) that has made the download request. For example, when the OTA campaign associated with the download request is No. 10, the control unit 28 transmits, as the request information, the first to the third necessity information associated with the OTA campaign No. 10 to the vehicle (the OTA master 11). Then, in this case, in step S22 of FIG. 8, the OTA master 11 determines that the OTA master 11 receives the request information for requesting the software update in the vehicle service area since the second necessity information indicates "necessary", and thus the OTA master 11 specifies the predetermined number (for example, three) of vehicle service areas that are close to the vehicle by the car navigation system, and causes the HMI 14 to display them as the software update places. For example, when the OTA campaign associated with the download request is No. 12, the control unit 28 transmits, as the request information, the first to the third necessity information according to the OTA campaign No. 12 to the vehicle (the OTA master 11). Then, in this case, in step S22 of FIG. 8, the OTA master 11 determines that the OTA master 11 receives the request information for requesting the software update in the vehicle service area or the Wi-Fi area since the third necessity information indicates "necessary", and thus the OTA master 11 specifies the predetermined number (for example, three) of vehicle service areas or Wi-Fi areas that are close to the vehicle by the car navigation system, and causes the HMI 14 to display them as the software update places. Thereafter, the process proceeds to step S5. Since the processes of steps S5 and S6 are the same as those of the first embodiment, the description thereof will be omitted.

As described above, with the first and the second embodiments, when the execution of the software update for the vehicle in a limited place (a predetermined place), such as a Wi-Fi area or a vehicle service area, is necessary, the OTA center 1 transmits, to the OTA master 11, information (request information) for requesting the execution of the software update in a predetermined place. As such, it is possible to appropriately execute the software update in a predetermined place.

Further, with the first and the second embodiments, in order to restrain the communication cost, when the vehicle needs to execute the software update in a Wi-Fi area or a vehicle service area in which connection to the vehicle service area communication network is possible (a network connection area where connection to a predetermined network is possible), the OTA center 1 transmits, to the OTA master 11, information (request information) for requesting the execution of the software update at the network connection area. Then, the vehicle (the OTA master 11) can move to any one of the above network connection areas by the car navigation system based on the request information and execute the software update, and thus it is possible to execute the software update while restraining the communication cost.

Further, with the first and the second embodiments, at the time of the execution of the software update, when the face-to-face description to the user is necessary or parts replacement is necessary, the OTA center 1 transmits, to the OTA master 11, information (request information) for requesting the execution of the software update in the vehicle service area (a vehicle dealer and the like) in which the above can be executed. Then, the vehicle (the OTA master 11) can move to any of the above vehicle service areas by the car navigation system based on the request information and appropriately execute the software update.

Further, with the first embodiment, the OTA center 1 can decide (determine), based on the regulation information (see FIG. 7) stored in advance, where the execution of the software update is necessary from among the predetermined place and notify the decision to the vehicle as the request information. For example, in the first embodiment, when the face-to-face description to the user is necessary or parts replacement is necessary, the OTA center 1 transmits, to the vehicle, the request information for requesting the software update in the vehicle service area. When restraining the communication cost of the software update is necessary, the OTA center 1 transmits, to the vehicle, the request information for requesting the software update in the vehicle service area or the Wi-Fi area. With such a configuration, it is possible to change the content of the request information (that is, the content on where the execution of the software update is necessary) by changing the content of the decision made by the OTA center 1 instead of changing the content of the regulation information, and thus operational flexibility is improved.

Modified Example

In the first and the second embodiments, a reason for the execution of the software update in the vehicle service area or the Wi-Fi area may be displayed on the vehicle side. For example, in the first embodiment (see FIG. 6), information indicating a reason why the face-to-face description (or the parts replacement) is necessary may be added (or included) to the request information and transmitted to the OTA master 11 in step S3, information indicating a reason why restraining the communication cost is necessary may be added (or included) to the request information and transmitted to the vehicle in step S4. Then, the OTA master 11 that has received the request information may display these reasons on the display unit of the car navigation system and describe them to the user.

Further, in the first and the second embodiments, a place in which the software update is executed is specified based on the information of the car navigation system of the vehicle (typically, the information of the vehicle service area or the Wi-Fi area registered in the car navigation system) (see S22 of FIG. 8). However, the storage unit 26 of the OTA center 1 may store list information of the vehicle service areas or the Wi-Fi areas and add the list information to (or include it in) the request information, and the OTA master 11 of the vehicle may specify the place in which the software update is executed based on the list information (using the car navigation system).

Further, the function of the OTA center 1 exemplified in the first and the second embodiments can also be implemented as a management method executed by a computer including one or more processors (one or more CPUs), one or more memories, and one or more communication devices, a management program executed by the computer, or a computer-readable non-transitory storage medium storing the management program. In the same manner, the function of the OTA master 11 exemplified as the present embodiments can also be implemented as a control method executed by a computer which includes one or more processors (one or more CPUs), one or more memories, and one or more communication devices and which is mounted on the vehicle, a control program executed by the computer mounted on the vehicle, or a computer-readable non-transitory storage medium storing the control program.

The technology of the present disclosure can be used in a network system used for updating a program of an ECU.

What is claimed is:

1. An over-the-air (OTA) center comprising:
one or more storage devices configured to store regulation information based on which a software update is determined whether or not to be a specific software update that needs to be executed only when a vehicle is positioned in a predetermined place; and
one or more processors configured to:
receive, via a network and from an OTA master mounted on the vehicle, a first request for a software update for a target electric control unit (ECU) mounted on the vehicle;
make, based on the regulation information, a determination whether the software update to be executed is the specific software update;
when the determination is positive:
transmit, to the OTA master, request information for requesting execution of the specific software update in the predetermined place;
upon receipt of a second download request from the vehicle that has moved to the predetermined place based on the request information, transmit update data for software of the target ECU to the OTA master; and
execute, by transmitting the update data, control for causing the OTA master to execute the software update for the target ECU of the vehicle at the predetermined place; and
when the determination is negative:
transmit the update data to the OTA master without transmitting the request information; and
execute the control for causing the OTA master to execute the software update for the target ECU.

2. The OTA center according to claim 1, wherein:
the predetermined place includes a network connection area that is an area where a predetermined network connection is allowable; and
the one or more processors are configured to, when requesting the execution of the specific software update in the network connection area, transmit, to the OTA master, the request information, which includes information for guiding the vehicle to the network connection area by a navigation system included in the vehicle.

3. The OTA center according to claim 1, wherein:
the predetermined place includes a vehicle service area that is an area where a vehicle service is receivable; and
the one or more processors are configured to, when requesting the execution of the specific software update in the vehicle service area, transmit, to the OTA master, the request information, which includes information for guiding the vehicle to the vehicle service area by a navigation system included in the vehicle.

4. The OTA center according to claim 2, wherein:
the predetermined place includes a vehicle service area that is an area where a vehicle service is receivable; and
the one or more processors are configured to, when requesting the execution of the specific software update in the vehicle service area, transmit, to the OTA master, the request information, which includes information for guiding the vehicle to the vehicle service area by the navigation system included in the vehicle.

5. The OTA center according to claim 4, wherein the one or more processors are configured to, when the determination is positive, determine whether to guide the vehicle to the network connection area or to the vehicle service area.

6. An update management method executed by a computer including one or more processors and one or more memories, the update management method comprising:
storing regulation information based on which a software update is determined whether or not to be a specific software update that needs to be executed only when a vehicle is positioned in a predetermined place;
receiving, via a network and from an over-the-air (OTA) master mounted on the vehicle, a first request for a software update for a target electric control unit (ECU) mounted on the vehicle;
making, based on the regulation information, a determination whether the software update to be executed is the specific software update;
when the determination is positive:
transmitting, to the OTA master, request information for requesting execution of the specific software update in the predetermined place;
upon receipt of a second download request from the vehicle that has moved to the predetermined place based on the request information, transmitting update data for software of the target ECU to the OTA master; and
executing, by transmitting the update data, control for causing the OTA master to execute the software update for the target ECU of the vehicle at the predetermined place; and
when the determination is negative:
transmitting the update data to the OTA master without transmitting the request information; and
executing the control for causing the OTA master to execute the software update for the target ECU.

7. A non-transitory computer-readable storage medium storing instructions that are executable by a computer which includes one or more processors and one or more memories, and that cause the computer to execute the method according to claim 6.

8. An over-the-air (OTA) master mounted on a vehicle, the OTA master comprising one or more processors configured to:

transmit, to an OTA center via a network, a first request for a software update for a target electric control unit (ECU) mounted on the vehicle;

cause, when receiving from the OTA center via the network request information for requesting execution of the software update in a predetermined place, a display unit mounted on the vehicle to display the predetermined place;

transmit, to the OTA center and once the vehicle has moved to the predetermined place based on the request information, a second download request;

receive, from the OTA center and in reply to the second download request, update data for software of the target ECU; and control software update for the target ECU using the update data.

9. The OTA master according to claim 8, wherein:
the predetermined place includes a network connection area that is an area where a predetermined network connection is allowable; and
the one or more processors are configured to, when receiving the request information for requesting the execution of the software update in the network connection area, guide, based on the request information, the vehicle to the network connection area by a navigation system included in the vehicle.

10. The OTA master according to claim 8, wherein:
the predetermined place includes a vehicle service area that is an area where a vehicle service is receivable; and
the one or more processors are configured to, when receiving the request information for requesting the execution of the software update in the vehicle service area, guide, based on the request information, the vehicle to the vehicle service area by a navigation system included in the vehicle.

11. The OTA master according to claim 9, wherein:
the predetermined place includes a vehicle service area that is an area where a vehicle service is receivable; and
the one or more processors are configured to, when receiving the request information for requesting the execution of the software update in the vehicle service area, guide, based on the request information, the vehicle to the vehicle service area by the navigation system included in the vehicle.

12. An update control method executed by a computer including one or more processors and one or more memories and mounted on a vehicle, the update control method comprising:
transmitting, to an over-the-air (OTA) center via a network, a first request for a software update for a target electric control unit (ECU) mounted on the vehicle;
causing, when receiving from the OTA center via the network request information for requesting execution of the software update in a predetermined place, a display unit mounted on the vehicle to display the predetermined place;
transmitting, to the OTA center and once the vehicle has moved to the predetermined place based on the request information, a second download request;
receiving, from the OTA center and in reply to the second download request, update data for software of the target ECU mounted on the vehicle; and
controlling the software update for the target ECU using the update data.

13. A non-transitory computer-readable storage medium storing instructions that are executable by a computer which includes one or more processors and one or more memories and which is mounted on a vehicle, and that cause the computer to execute the update control method according to claim 12.

* * * * *